(No Model.) 3 Sheets—Sheet 2.
W. J. LLOYD & W. PRIEST.
VELOCIPEDE.
No. 450,888. Patented Apr. 21, 1891.
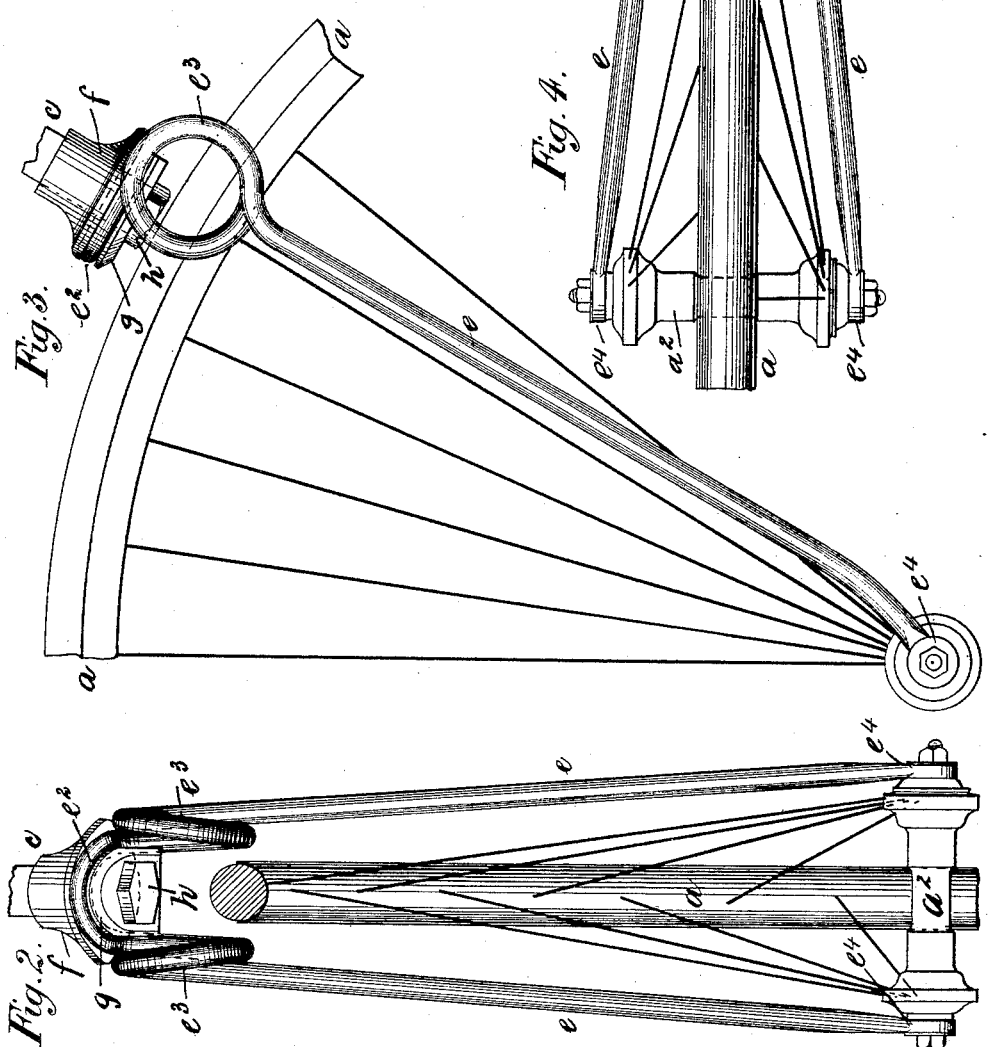

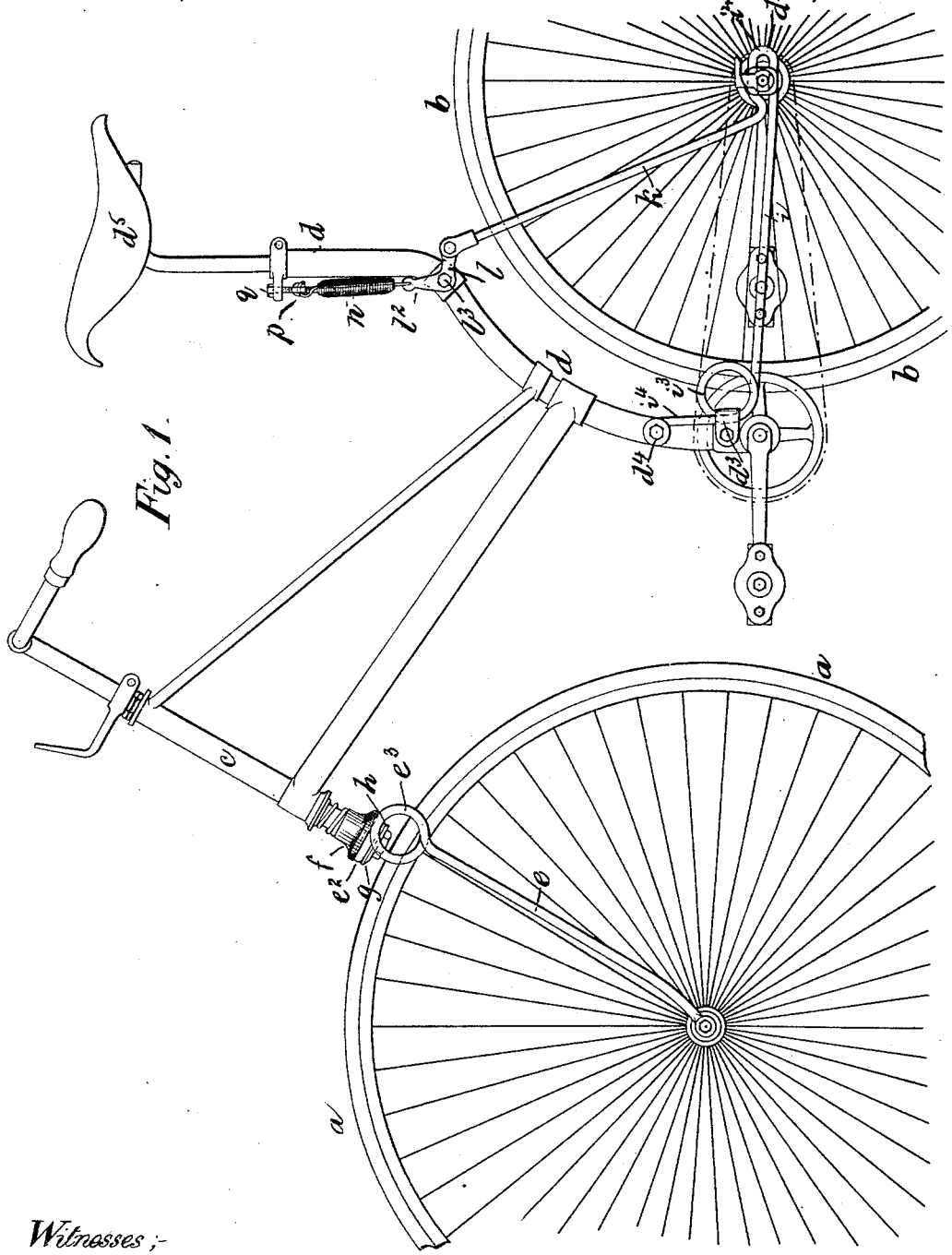

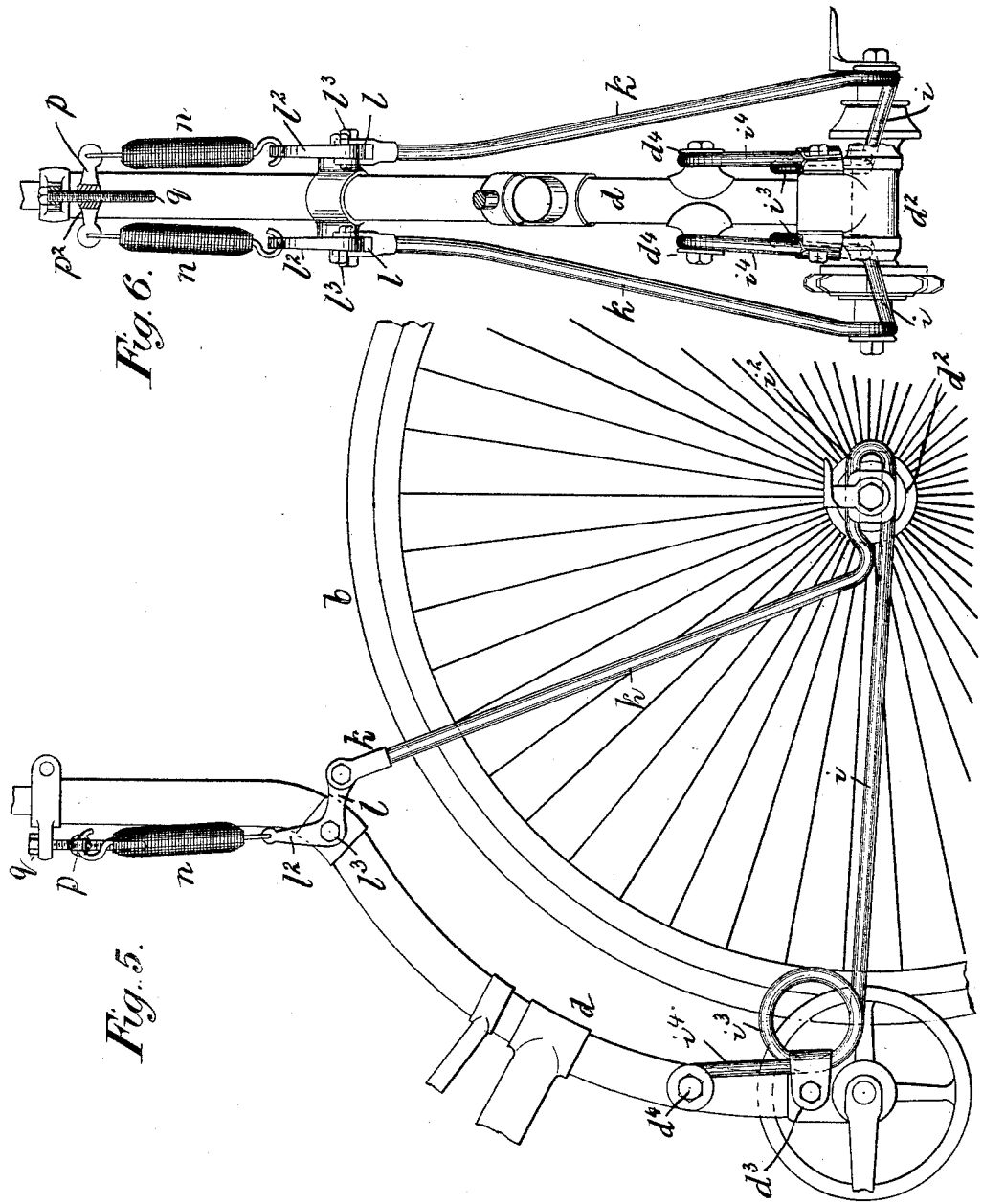

UNITED STATES PATENT OFFICE.

WALTER JOHN LLOYD AND WILLIAM PRIEST, OF BIRMINGHAM, ENGLAND.

VELOCIPEDE.

SPECIFICATION forming part of Letters Patent No. 450,888, dated April 21, 1891.

Application filed January 3, 1891. Serial No. 376,633. (No model.)

*To all whom it may concern:*

Be it known that we, WALTER JOHN LLOYD and WILLIAM PRIEST, both of Birmingham, England, subjects of the Queen of Great Britain, have invented certain new and useful Improvements in Bicycles, Tricycles, and other Velocipedes; and we do hereby declare that the following is a full, clear, and exact description of the invention, which will enable others skilled in the art to which it appertains to make and use the same.

Our invention has for its object to prevent or diminish the tremulous motion of the steering and driving wheels of velocipedes produced by the inequalities or asperities of the road over which they travel; and it consists of the improvements hereinafter described in making the forks of the steering and driving wheels of velocipedes.

We will describe our invention in connection with the steering and back forks of a bicycle of the kind known as a "Safety" bicycle.

Instead of making the branches of the steering-fork rigid and in one piece with or rigidly connected to the steering-post by welding them or otherwise fixing them thereto, we make and attach the fork to the steering-post in the following manner: Each branch of the fork is made of a strong hardened and tempered steel rod or wire, preferably cylindrical and nearly straight through the greater part of its length. Near its upper end—that is, the end connected to the steering-post—a flat coil consisting of one or more convolutions is made, the axis of the coil being parallel or nearly parallel with the axis of the steering-wheel carried by the fork. Each branch of the fork is made as described, may be connected to the steering-post by its upper end taking into a socket fixed to the steering-post and secured in the said socket by a screw and screw-nut. Other methods, however, may be adopted of connecting the fork to the steering-post. Instead of making the branches of the fork of separate pieces of steel rods or wire, the two branches may be made of one long steel rod or wire doubled at its middle and having the flat parallel coils formed immediately below the doubled or bent part. The fork in this case is connected to the steering-post at the doubled part or bend.

Steering-wheel forks made according to our invention prevent or diminish the tremulous motion of the velocipede when traveling.

We make the back forks of the rear or driving wheels of strong wires or rods of hardened and tempered steel, the lower branch of the fork having near the end fixed to the seat-post a flat coiled spring of one or more convolutions. That end of the upper branch of each fork which is usually connected rigidly to the seat-post we connect thereto by a bell-crank lever jointed to the seat-post. The end of the said upper branch of the fork is jointed to the end of the bell-crank lever at the rear of the seat-post, and the other end of the said lever in front of the seat-post is connected to the seat-post by a strong helical spring, the tension of which is capable of adjustment to suit riders of different weights.

The action of the parts of the back forks is as follows: When the driving-wheel passes over a pebble or other obstruction and is thereby suddenly jerked upward, the lower branch of the fork performs a slight upward angular motion, the coil near the junction of the said branch with the seat-post being slightly contracted and brought into a state of tension. The upper branch of the fork presses upward the arm of the bell-crank lever, to which it is jointed, depressing the other arm and putting the helical spring it is jointed to into a state of tension. Thus the jerking motion of the driving-wheel produced by its passage over obstacles is taken up by the springs described, and no tremulous motion is conveyed to the seat-post and seat.

We will now proceed to describe with reference to the accompanying drawings the manner in which our invention is to be performed.

Figure 1 represents in side elevation a Safety bicycle to which spring or elastic forks for the front or steering wheel and the driving or rear wheel of the said bicycle are applied. Fig. 2 represents in front elevation, Fig. 3 in side elevation, and Fig. 4 in plan, a portion of the steering-wheel and its fork, together with a portion of the steering-post, drawn to a larger scale than Fig. 1. Fig. 5 represents in side elevation, and Fig. 6 in end elevation, the driving-wheel and its fork and apparatus connected therewith, together with the seat-post, drawn to a larger scale than Fig. 1.

The same letters of reference indicate the same parts in the several figures of the drawings.

$a$ is the steering-wheel, and $b$ the driving-wheel, of the Safety bicycle. $c$ is the steering-post and $d$ the seat-post. The fork supporting the steering-wheel $a$ consists of the two branches $e\ e$, made from a hardened and tempered cylindrical steel rod or strong wire doubled at its middle, the two branches being joined by the nearly-horizontal bend or loop $e^2$. (See Fig. 4.) Immediately below the bend or loop $e^2$ of the fork are flat parallel coils $e^3\ e^3$, consisting of one or more convolutions, and the lower extreme end of each branch is flattened and expanded at $e^4$ to form an eye or bush for fitting and fixing it upon the hub $a^2$ of the steering-wheel $a$. The fork is connected to the steering-post $c$ of the Safety bicycle by fixing the loop or bend $e^2$ between the cupped collar $f$ on the bottom of the steering-post and the under washer $g$ by the screw-bolt $h$, screwed into the tubular part of the said steering-post. When each branch of the fork is made of a separate rod or wire the upper end of the branch above the flat coil $t^3$ takes into a socket in the steering-post $c$ and is secured therein by a set-screw or screw and screw-nut. We do not, however, limit ourselves to any particular method of connecting the elastic or spring forks, whether made of a single rod or of two separate rods, to the steering-post. The steel rods are properly hardened and tempered after they have been fashioned into the forks. As the steering-wheel travels over the irregularities or asperities of the road the tremulous or jerking motion of the said wheel is absorbed or taken up by the springs $e^3\ e^3$ of the fork and little or no tremulous motion is imparted to the steering-post and to the frame connected to the seat-post.

We will now describe the elastic fork of the driving or back wheel $b$ of the Safety bicycle. Each of the branches or sides of this fork is bent from a strong steel rod or wire, each branch having an angular figure—that is to say, each side of the fork consists of the lower part or branch $i$, and the upper branch or part $k$, the two branches $i\ k$ of each side making the angle with one another (represented in Fig. 5,) and having at their junction the loop or bend $i^2$, which is connected to the hub $d^2$ of the driving-wheel $b$. Near the end of the lower branch $i$ is a flat coil $i^3$, and the end $i^4$ of the said branch is fixed to the seat-post $d$ by the loop $d^3$, the extreme end of the wire or rod bearing against the projection $d^4$ on the seat-post. The end of the upper branch $k$ of each fork is connected to the arm $l$ of a bell-crank lever $l\ l^2$, jointed at $l^3$ to the clip on the seat-post $d$, (see Figs. 5 and 6,) and the upper arm $l^2$ of the said bell-crank lever is connected to the seat-post by a strong helical spring $n$. The helical springs $n\ n$ connected to the two sides of the fork are secured to the cross piece or bar $p$, carried by and working on the vertical screw $q$ at the top of the seat-post, the screw $p$ being capable only of a rotary motion, so that the screw-box at $p^2$ of the cross piece or bar $p$, when the screw is rotated, rises and falls upon the said screw. By means of this arrangement the tension of the strong helical springs $n\ n$ can be adjusted to suit riders of different weights.

Should the driving-wheel $b$ in its traveling motion pass over a pebble or other obstacle, so as to jerk it suddenly upward, the lower branch $i$ of each fork performs a short upward irregular motion, thereby causing the flat coil $i^3$ to slightly contract and bringing it into a state of tension. By this upward motion of the lower branch $i$ of each fork the upper branch $k$ is pressed upward, and, acting through the bell-crank lever $l\ l^2$, pulls down the helical spring $n$ and puts it into a state of tension. In this way the jerking motion of the driving-wheel $b$, produced by its passage over obstacles, is taken up by the springs of the fork and by the springs $n\ n$ and little or no tremulous motion is transmitted to the seat-post $d$ and seat $d^5$ carried by it.

The helical springs $n\ n$ and bell-crank levers $l\ l^2$, described and represented, may be dispensed with, in which case the end of the upper branch $k$ of each fork is jointed to the seat-post $d$ by a short link. We prefer, however, to employ the said bell-crank levers and adjustable helical springs, as by their employment not only is the jerking motion of the driving-wheel the more effectually cut off from the seat-post, but the elasticity of the bicycle can be readily adjusted for riders of different weights.

The spring-forks described and represented may be applied to the steering and driving wheels of bicycles and other velocipedes, and the spring-fork represented in connection with the steering-wheel of a Safety bicycle may be applied to the small or trailing wheel of an ordinary bicycle.

Having now particularly described and ascertained the nature of our invention and the manner in which the same is to be performed, we declare that we claim as our invention—

1. The combination, with the front wheel $a$ and the steering-post $c$, of the tempered spring-steel rod or wire fork engaged with the front wheel-hub, bent centrally between its extremities into the loop $e^2$, engaged with and clamped to the lower end of the steering-post, and having each branch $e$ provided with a bent portion to form a spring $e^3$ between the loop and the extremities engaging the axle-hub, substantially as described.

2. The combination, with the front wheel $a$, having a hub $a^2$, and the steering-post $c$, of the tempered spring-steel rod or wire fork engaged with the wheel-hub, bent centrally between its extremities into the loop $e^2$ for receiving the lower end of the steering-post and having each branch $e$ formed integral with a coil $e^3$ in juxtaposition to the loop, and a clamp $f\ g\ h$ for attaching the loop to the steering-post, substantially as described.

3. Making the forks of the driving-wheels of Safety bicycles, tricycles, and other velocipedes from hardened and tempered steel rods or strong wire bent and fashioned, as described and shown, so as to form a loop at the junction of the two branches of each fork and near the junction of the lower branch with the lower part of the seat-post a coil or spring, and connecting the upper branch either by a link with the upper part of the seat-post or through a cranked lever to an adjustable helical spring on the seat-post, the elastic forks so made preventing or diminishing the tremulous motion of the velocipede, substantially as described and shown.

WALTER JOHN LLOYD. [L. S.]
WILLIAM PRIEST. [L. S.]

Witnesses:
GEORGE SHAW,
RICHARD SKERRETT.